US008595725B2

(12) United States Patent
Tjia et al.

(10) Patent No.: US 8,595,725 B2
(45) Date of Patent: Nov. 26, 2013

(54) METHOD AND SYSTEM FOR PROCESSING JOBS WITH TWO DUAL-ROLE DEVICES

(75) Inventors: Jerome Tjia, Singapore (SG); Zhenyu Zhang, San Jose, CA (US)

(73) Assignee: NXP, B.V., Eindhoven (NL)

( * ) Notice: Subject to any disclaimer, the term of this patent is extended or adjusted under 35 U.S.C. 154(b) by 1428 days.

(21) Appl. No.: 11/596,830

(22) PCT Filed: May 20, 2005

(86) PCT No.: PCT/IB2005/051656
§ 371 (c)(1),
(2), (4) Date: Nov. 1, 2007

(87) PCT Pub. No.: WO2005/114413
PCT Pub. Date: Dec. 1, 2005

(65) Prior Publication Data
US 2008/0141259 A1    Jun. 12, 2008

Related U.S. Application Data

(60) Provisional application No. 60/612,752, filed on Sep. 24, 2004, provisional application No. 60/573,044, filed on May 21, 2004.

(51) Int. Cl.
*G06F 9/46* (2006.01)
*G06F 13/20* (2006.01)
*G06F 15/16* (2006.01)
*G06F 15/173* (2006.01)

(52) U.S. Cl.
USPC ........... 718/100; 710/313; 709/201; 709/208; 709/227; 709/238

(58) Field of Classification Search
None
See application file for complete search history.

(56) References Cited

U.S. PATENT DOCUMENTS

| 6,732,218 B2* | 5/2004 | Overtoom et al. ............ 710/313 |
| 7,568,031 B2* | 7/2009 | Tanimoto ...................... 709/225 |
| 2004/0088449 A1* | 5/2004 | Sakaki ............................. 710/15 |
| 2007/0011226 A1* | 1/2007 | Hinni et al. .................... 709/203 |
| 2008/0141259 A1* | 6/2008 | Tjia et al. ...................... 718/104 |

FOREIGN PATENT DOCUMENTS

WO    9964952 A1    12/1999

OTHER PUBLICATIONS

Anonymous: "USB On-The-Go: A Tutorial" Philips Semiconductors Document No. 9397-750-09316, "Online" Jan. 2202.
Yarra S: "USB OTG Software Frees Dual-Role Handheld Devices"; EDN (US Edition) Cahners Publishing USA; vol. 47 No. 11; May 16, 2002; pp. 83-84, 86-88.

* cited by examiner

*Primary Examiner* — Emerson Puente
*Assistant Examiner* — Adam Lee

(57) ABSTRACT

A collaboration request may be sent to a host or a peripheral when a job is to be processed. The job may include one or more tasks. The host determines which device is better suited to act as host by analyzing the type of task or job to be executed and the capabilities of the host and peripheral. If the peripheral is better suited to act as host, the host and peripheral swap roles and control of a task or job is transferred to the peripheral. The host and peripheral may return to their default roles once the task or job is complete.

15 Claims, 6 Drawing Sheets

METHOD AND SYSTEM FOR PROCESSING JOBS WITH TWO DUAL-ROLE DEVICES

A dual-role device (DRD) is a device that can act as a host or a peripheral. FIG. 1 is a diagrammatic illustration of a system in accordance with the prior art. System 100 includes DRD 102 and DRD 104. DRD 102 includes connector 106 and DRD includes connector 108. Connectors 106, 108 are mini-AB plugs when system 100 complies with the On-The-Go Supplement to the Universal Serial Bus 2.0 Specification. DRDs 102, 104 assume a default role when a plug is inserted into connectors 106, 108, respectively. When a mini-A plug is inserted into connector 106, DRD 102 defaults into a host mode. When a mini-B plug is inserted into connector 108, DRD 104 defaults into a peripheral mode.

System 100 is typically asymmetrical in that one device, usually the host, is assumed to be more capable than the peripheral. But this assumption is not always correct. For example, an MP3 player, which defaults to a host, may exchange audio files with a personal digital assistant (PDA), which defaults to a peripheral. Some users would prefer the PDA be the host because the PDA has a larger display, a larger keyboard, and a more extensive graphical user interface. A host, however, is not able to determine which device, the host or the peripheral, is better suited to act as a host.

In accordance with the invention, a method and system for processing jobs with two dual-role devices are provided. A collaboration request is sent to a host or a peripheral when a job is to be processed. The job includes one or more tasks. The host determines which device is better suited to act as host by analyzing the type of task or job to be executed and the capabilities of the host and peripheral. If the peripheral is better suited to act as host, the host and peripheral swap roles and control of a task or job is transferred to the peripheral. The host and peripheral may return to their default roles once the task or job is complete.

The following description is presented to enable one skilled in the art to make and use embodiments of the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 1:
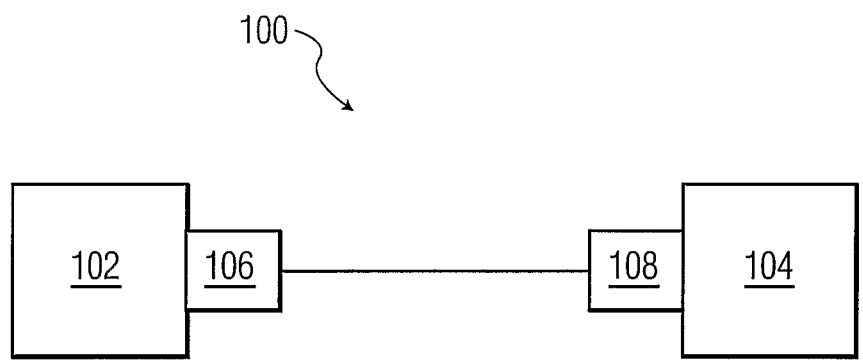
FIG. 1 is a diagrammatic illustration of a system in accordance with the prior art.
Figure 2A:
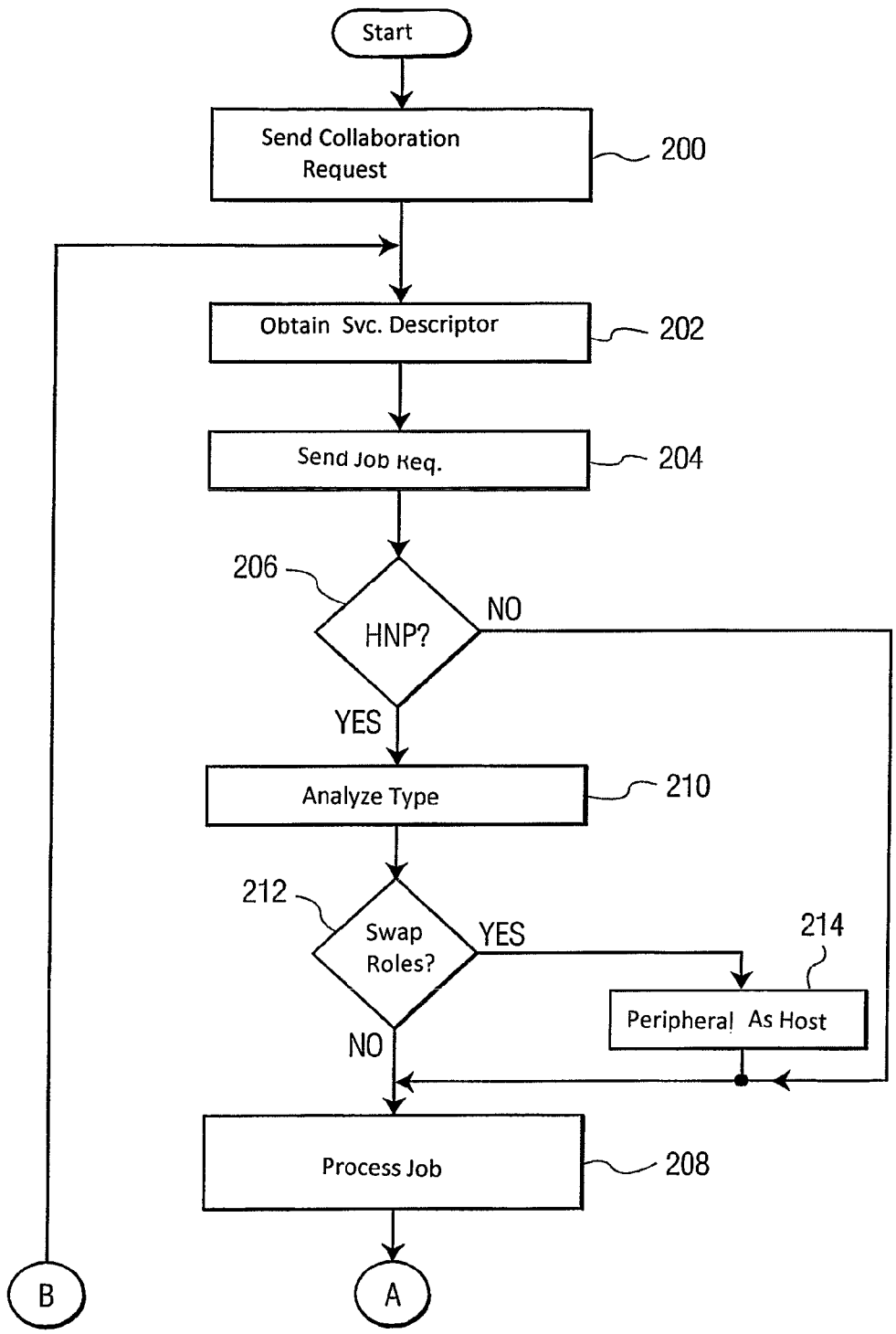
FIGS. 2A-2B is a flowchart of a method for processing jobs by a host dual-role device in an embodiment in accordance with the invention.
Figure 2B:
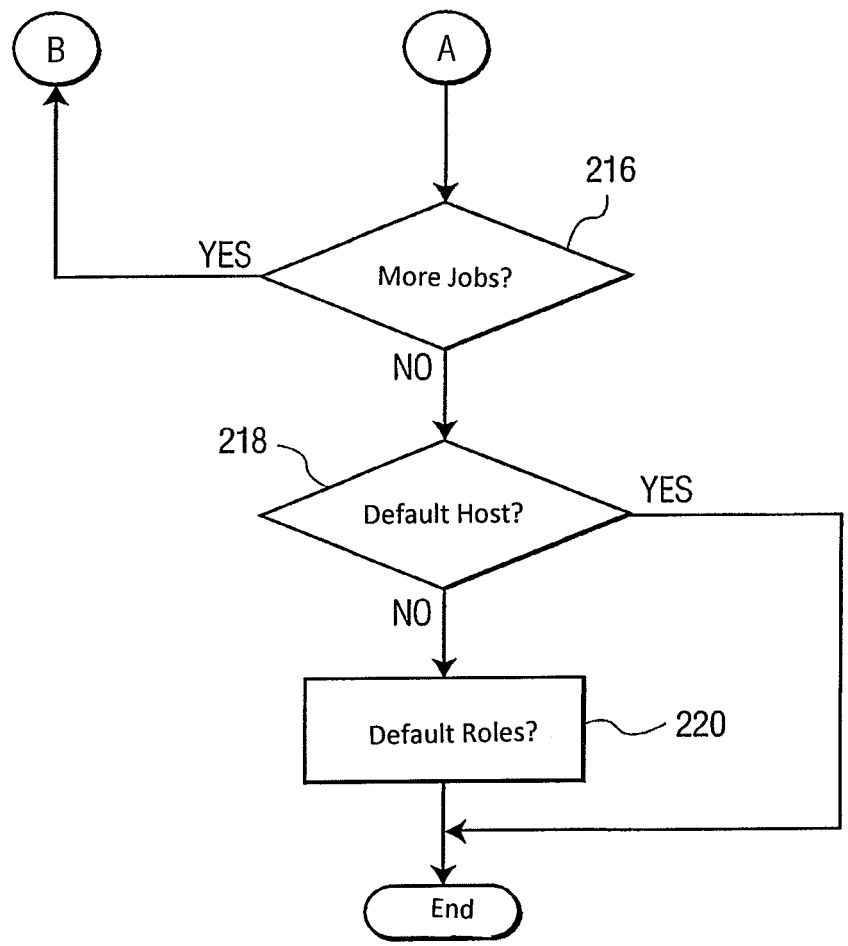

With reference to the figures and in particular with reference to FIGS. 2A-2B, there is shown a flowchart of a method for processing jobs by a host dual-role device in an embodiment in accordance with the invention. Initially a collaboration request is sent to a host, as shown in block 200. The collaboration request may be sent, for example, using a separate interrupt pipe.

The host then obtains a service descriptor from a peripheral, as shown in block 202. The service descriptor includes a service list specifying the capabilities of the peripheral. The host also transmits a job request to the peripheral (block 204). The job request specifies the type of job to be executed. The job may include one or more tasks and each task is distributed to the device (host or peripheral) best suited to control the task. In one embodiment in accordance with the invention, the service descriptor and the job request are sent using a USB CTRL pipe.

A determination is then made at block 206 as to whether the host should perform a Host Negotiation Process (HNP). In one embodiment in accordance with the invention, HNP follows the process specified in the On-The-Go Supplement to the Universal Serial Bus 2.0 Specification. If HNP is not performed, the process passes to block 208 where the host controls processing of the job or task and generation of a job result.

If HNP is performed, the host analyzes the type of job or task to be executed and the capabilities of the host and the peripheral to determine which device will act as host (block 210). As part of this process, the host determines whether the roles of host and peripheral should be swapped (block 212). As discussed earlier, the roles of host and peripheral may be swapped for an entire job or for one or more tasks included in the job.

If the roles of host and peripheral are not swapped, the host controls processing of the job or one or more tasks (block 208). If the roles are swapped, control of the job or task is transferred to the peripheral and the peripheral assumes the role of host (block 214). The peripheral, acting as host, then controls the processing of the job or one or more tasks in the job and returns the result to the default host.

A determination is then made at block 216 as to whether there are more jobs or tasks to be processed. If so, the method returns to block 202 and repeats until all of the jobs or all of the tasks are complete. The host and peripheral may repeatedly swap roles during this time. When all of the jobs have been processed, a determination is made at block 218 as to whether the device that is acting as the host is the default host. If not, the roles of host and peripheral are returned to the default roles at block 220 and the method ends.

Figure 3A:
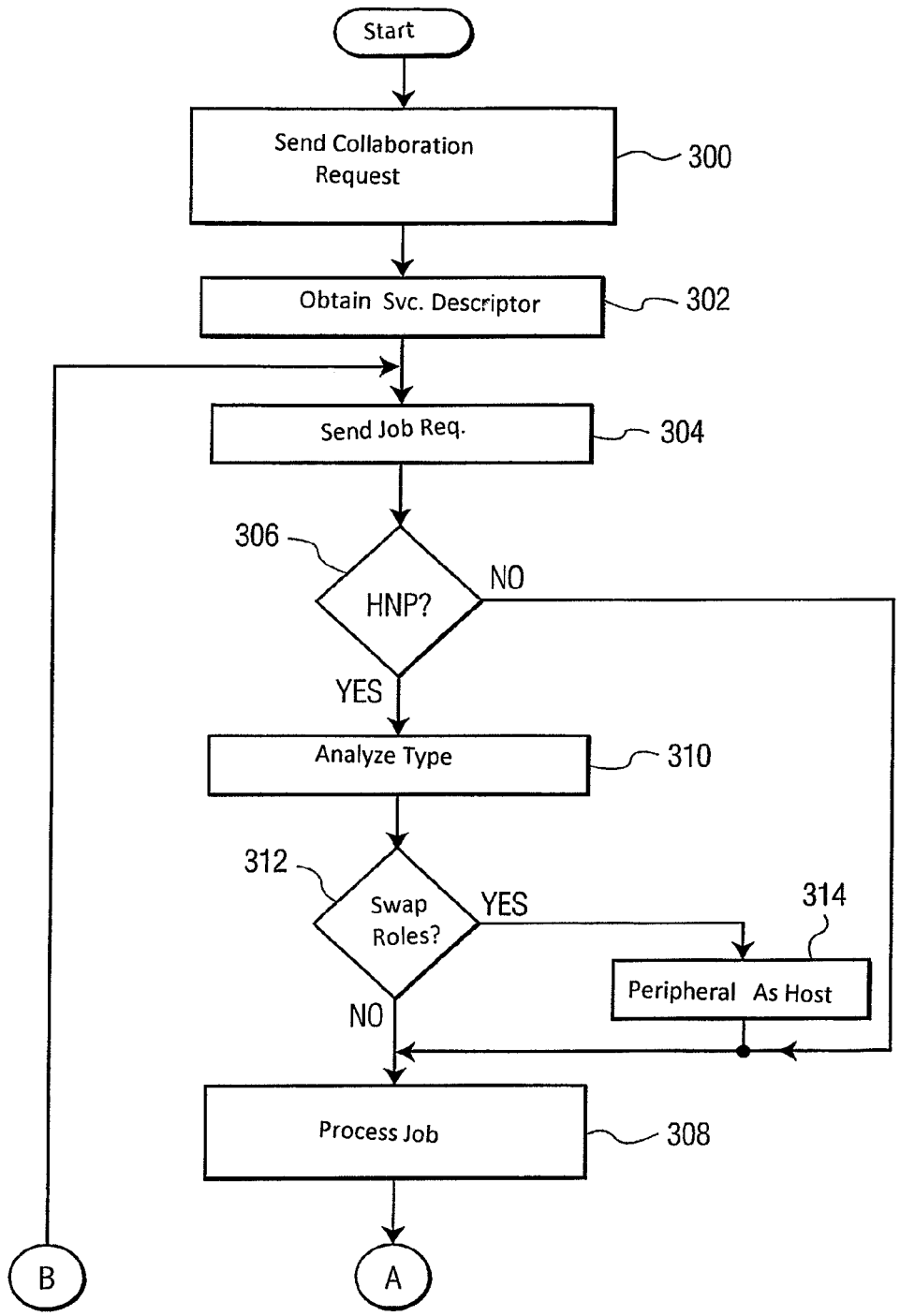
FIGS. 3A-3B is a flowchart of a method for processing jobs by a peripheral dual-role device in an embodiment in accordance with the invention.
Figure 3B:
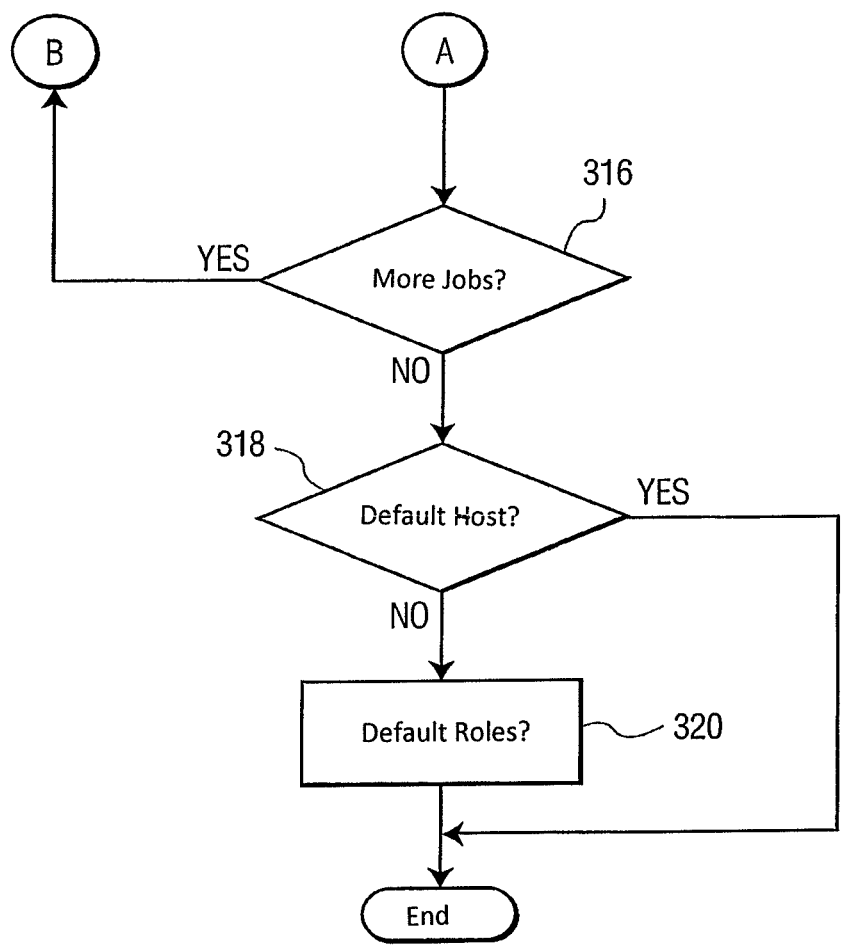

FIGS. 3A-3B is a flowchart of a method for processing jobs by a peripheral dual-role device in an embodiment in accordance with the invention. Initially a collaboration request is sent to a peripheral and the peripheral transmits the request to the host, as shown in block 300. In one embodiment in accordance with the invention, the peripheral sends the collaboration request to the host using SRP or the INT pipe for USB.

The peripheral then presents the host with a service descriptor, as shown in block 302. The service descriptor includes a service list specifying the capabilities of the peripheral device. The host also transmits a job request to the peripheral device (block 304). The job request specifies the type of job to be executed. The job may include one or more tasks to process and each task is distributed to the device (host or peripheral) best suited to process or complete the task. In one embodiment in accordance with the invention, the service descriptor and the job request are sent using the CTRL pipe for USB.

A determination is then made at block 306 as to whether a HNP should be performed. If HNP is not performed, the process passes to block 308 where processing of the job or one or more tasks is controlled by the host. If HNP is performed, the host analyzes the job or task to be executed and the capabilities of the host and the peripheral to determine which device should be the host (block 310). As part of this process, the host determines whether the roles of host and peripheral should be swapped (block 312).

If the roles of host and peripheral are not swapped, the host controls processing of the job or task (block 308). If the roles are swapped, control of the job is transferred to the peripheral and the peripheral assumes the role of host (block 314). Acting as a host, the peripheral controls the processing of the job or task and returns the results to the default host (block 308).

A determination is then made at block 316 as to whether there are more jobs or tasks to be processed. If so, the method returns to block 302 and repeats until all of the jobs are processed. When all of the jobs have been processed, a determination is made as to whether the device that has assumed the role of host is the default host. If not, the roles of host and peripheral are returned to the default roles at block 320 and the method ends.

In one embodiment in accordance with the invention, the host and peripheral automatically determine which device is best suited to act as host. In other embodiments in accordance with the invention, role-swapping may be initiated by an application or by a user.

Appendix A includes exemplary collaboration extensions to the USB framework. These exemplary extensions may be used to implement the embodiments of FIGS. 2A-2B and FIGS. 3A-3B. Embodiments in accordance with the invention, however, are not limited to the extensions shown in Appendix A. Any extensions that allow a host to determine which device is best suited to be host and transfer control of a job or task to an acting host may be used in other embodiments in accordance with the invention.

Figure 4:
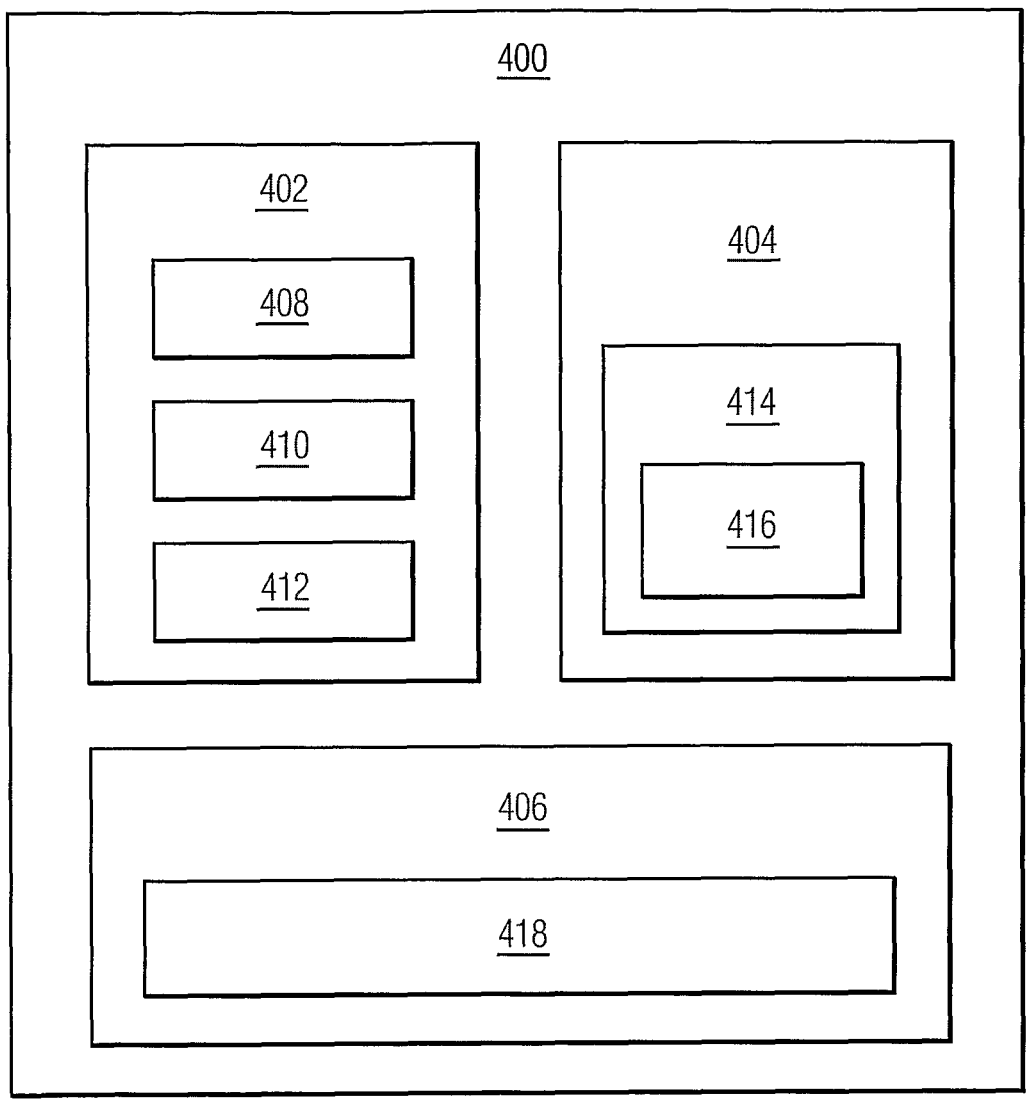
FIG. 4 is a diagrammatic illustration of a dual-role device in an embodiment in accordance with the invention.

Referring now to FIG. 4, there is shown a diagrammatic illustration of a dual-role device in an embodiment in accordance with the invention. DRD 400 includes host service container 402, peripheral service container 404, and generic service container 406. In the embodiment of FIG. 4, host service container 402 includes USB dependent host-side services, such as, for example, targeted host service list 408, targeted peripheral list 410, and targeted class list 412.

Targeted host service list 408 lists which application services are supported by DRD 400. For example, targeted service list 408 may provide an application-specific GUID such as a DPS printing service. Targeted peripheral list 410 describes which peripherals DRD 400 supports. Targeted peripheral list 410 may include, for example, USB product identification and USB vendor identification. And targeted class list 412 lists which class drivers are supported by DRD 400 by providing, for example, USB class codes and USB protocol codes.

Peripheral service container 404 includes USB dependent peripheral-side services, which may include, for example, USB configuration descriptor 414 and USB interface descriptor 416. And generic service container 406 includes USB agnostic services, which may be configured as, for example, as targeted service list 418 including data link level services other than USB link and high-level services above the USB data link layer.

APPENDIX

TABLE 1

Standard Collaboration Interface Descriptor

| Offset | Field | Size | Value | Description |
|---|---|---|---|---|
| 0 | bLength | 1 | Number | Size of this descriptor, in bytes: 9 |
| 1 | bDescriptorType | 1 | Constant | INTERFACE descriptor type |
| 2 | bInterfaceNumber | 1 | Number | Number of interface. A zero-based value identifying the index in the array of concurrent interfaces supported by this configuration. |
| 3 | bAlternateSetting | 1 | Number | Set to 0. |
| 4 | bNumEndpoints | 1 | Number | Number of endpoints used by this interface (excluding endpoint 0). This number is either 0 or 1 if the optional interrupt endpoint is present. |
| 5 | bInterfaceClass | 1 | Class | COLLABORATION. Collaboration Interface Class code. |
| 6 | bInterfaceSubClass | 1 | Subclass | |
| 7 | bInterfaceProtocol | 1 | Protocol | Not used. Set to 0. |
| 8 | iInterface | 1 | Index | Index of a string descriptor that describes this interface. |

TABLE 2

Standard Collaboration Interrupt Endpoint Descriptor

| Offset | Field | Size | Value | Description |
|---|---|---|---|---|
| 0 | bLength | 1 | Number | Size of this descriptor, in bytes: 7 |
| 1 | bDescriptorType | 1 | Constant | ENDPOINT descriptor type |
| 2 | bEndpointAddress | 1 | Endpoint | The address of the endpoint on the USB device described by this descriptor. The address is encoded as follows:<br>D7: Direction. 1 = IN endpoint<br>D6 . . . 4: Reserved, reset to zero<br>D3 . . . 0: The endpoint number, determined by the designer. |
| 3 | bmAttributes | 1 | Bit Map | D1 . . . 0: Transfer Type<br>11 = Interrupt<br>All other bits are reserved. |

TABLE 2-continued

Standard Collaboration Interrupt Endpoint Descriptor

| Offset | Field | Size | Value | Description |
|---|---|---|---|---|
| 4 | wMaxPacketSize | 2 | Number | Maximum packet size this endpoint is capable of sending or receiving when this configuration is selected. Used here to pass 6-byte interrupt information. |
| 6 | bInterval | 1 | Number | Interval for polling the Interrupt endpoint. |

TABLE 3

Collaboration Descriptor

| Offset | Field | Size | Value | Description |
|---|---|---|---|---|
| 0 | bLength | 1 | Number(3) | Size of Descriptor |
| 1 | bDescriptorType | 1 | Constant | TYPE_COLLAB, see Table 11 |
| 2 | bmAttributes | 1 | Bitmap | Attribute Fields D7...2: Reserved (reset to zero) D0: 1, if support INT endpoint |

TABLE 4

Service Descriptor

| Offset | Field | Size | Value | Description |
|---|---|---|---|---|
| 0 | bLength | 1 | Number (3) | Size of Descriptor |
| 1 | bDescriptorType | 1 | Constant | TYPE_SERVICE, see Table 11 |
| 2 | wTotalLength | 2 | Number | Total bytes returns for this descriptor |
| 4 | ServiceList | Variable | | See Table 5 |

TABLE 5

Service List

| Offset | Field | Size | Value | Description |
|---|---|---|---|---|
| 0 | bDescriptorSubType | 1 | Constant | SUBTYPE_TPL: for targeted peripheral list SUBTYPE_TCL: for targeted class list SUBTYPE_THSL: for targeted host service list see Table 11 |
| 1 | wServiceIndex | 2 | var | |
| 3 | ServiceScope | Variable | | |

TABLE 6

Job Request Descriptor

| Offset | Field | Size | Value | Description |
|---|---|---|---|---|
| 0 | bLength | 1 | Number (3) | Size of Descriptor |
| 1 | bDescriptorType | 1 | Constant | TYPE_JOB_REQ, see Table 11 |
| 2 | wTotalLength | 2 | Number | Total bytes returns for this descriptor |
| 4 | dwJobTag | 4 | Variables | A unique ID for a job |
| 8 | JobScope | Variable | | See Table 7 |

TABLE 7

Job Scope

| Offset | Field | Size | Value | Description |
|---|---|---|---|---|
| 0 | bJobCode | 1 | variables | See Table 13. |
| 1 | bmJobAttributes | Variable | | |

TABLE 8

Job Result Descriptor

| Offset | Field | Size | Value | Description |
|---|---|---|---|---|
| 0 | bLength | 1 | Number (3) | Size of Descriptor |
| 1 | bDescriptorType | 1 | Constant | TYPE_JOB_RES, see Table 11 |
| 2 | wTotalLength | 2 | Number | Total bytes returns for this descriptor |
| 4 | dwJob Tag | 4 | Variables | A unique ID for a job |
| 8 | bmResult | Variable | | |

TABLE 9

Notification Packet

| Offset | Field | Size | Value | Description |
|---|---|---|---|---|
| 0 | bType | 1 | number | See Table 10 |
| 1 | Notification specific | 1 | var | The message portion depends on the value of bType |

TABLE 10

Notification Message Type

| Name | Description |
|---|---|
| COLLAB_REQ | Notify the host that collaboration is requested |
| COLLAB_OVER | Notify the host that collaboration session is over |
| JOB_REQ | The host needs to retrieve a new job request by "GET_JOB_REQ( )" |

TABLE 10-continued

Notification Message Type

| Name | Description |
|---|---|
| JOB_DONE | Job is done, the host could get the results by "GET_JOB_RES( )" |
| JOB_CANCEL | To notify the host that a job is cancelled. |

TABLE 11

Descriptor Type

| wWalue | Description |
|---|---|
| TYPE_COLLAB | Collaboration descriptor |
| TYPE_SERVICE | Service descriptor |
| TYPE_JOB_REQ | Job request descriptor |
| TYPE_JOB_RES | Job result descriptor |
| SUBTYPE_TPL | Targeted peripheral list descriptor |
| SUBTYPE_TCL | Targeted class driver descriptor |
| SUBTYPE_THSL | Targeted host service list |
| SUBTYPE_OTHER | Other descriptor |

TABLE 12

DRD Requests

| Request | bmRequest Type | bRequest | wValue | | wIndex | wLength | Data |
|---|---|---|---|---|---|---|---|
| Get Collaboration Descriptor | 10000000B | GET_DESCRIPTOR | TYPE_COLLAB | | zero | Size of Collaboration Descriptor | Collaboration Descriptor |
| Get Service Descriptor | 10000000B | GET_DESCRIPTOR | TYPE_SERVICE | SUBTYPE_TPL SUBTYPE_TCL SUBTYPE_THSL SUBTYPE_Other | wIndex | Descriptor Length | Service Descriptor |
| Get Job Request | 10000000B | GET_DESCRIPTOR | TYPE_JOB_REQ | | zero | Descriptor Length | Job Descriptor |
| Get Job Result | 10000000B | GET_DESCRIPTOR | TYPE_JOB_RES | | zero | Descriptor Length | Result Descriptor |
| Advertise Service Descriptor | 0000000B | GET_DESCRIPTOR | TYPE_SERVICE | SUBTYPE_TPL SUBTYPE_TCL SUBTYPE_THSL SUBTYPE_Other | wIndex | Descriptor Length | Service Descriptor |
| Set Job Result | 00000000B | SET_DESCRIPTOR | TYPE_JOB_RES | | zero | Descriptor Length | Result Descriptor |
| Set Job Request | 00000000B | SET_DESCRIPTOR | TYPE_JOB_REQ | | Zero | Descriptor Length | Job Descriptor |

TABLE 13

Job Codes

| wWalue | Value | Description |
| --- | --- | --- |
| INVOKE_HOST_SERVICE | Variable | The device asks the host to invoke a service at the host side |
| INVOKE_DEV_SERVICE | Variable | The host asks the device to invoke a service at the device side. |
| CONFIG_DEV | Variable | The device asks the host to enumerate it into a specific configuration after USB session is up by SRP. |

TABLE 13-continued

Job Codes

| wWalue | Value | Description |
| --- | --- | --- |
| RUN_HNP_&_CONFIG_DEV | Variable | The current host asks for HNP to reverse host-device relationship, and asks the future host to enumerate it into a specific configuration. |

Get Collaboration Descriptor

This request returns Collaboration Descriptor.

| BmRequestType | bRequest | wValue | wIndex | wLength | Data |
| --- | --- | --- | --- | --- | --- |
| 10000000B | GET_DESCRIPTOR | TYPE_COLLAB | Zero | Length of Descriptor | Service Descriptor |

It is a Request Error if the USB Device doesn't support collaboration mechanism.
It is a Request Error if wValue or wIndex are other than as specified above.

Get Service Descriptor

This request returns Service Descriptor.

| bmRequestType | bRequest | wValue | wIndex | wLength | Data |
| --- | --- | --- | --- | --- | --- |
| 10000000B | GET_DESCRIPTOR | TYPE_SERVICE | SUBTYPE_TPL SUBTYPE_TCL SUBTYPE_THSL SUBTYPE_OTHER | var | Length of Descriptor | Service Descriptor |

It is a Request Error if the USB Device doesn't support collaboration mechanism.
It is a Request Error if wValue or wIndex are other than as specified above.
If wIndex is 0xFFFFFFFF, the service descriptor contains all service lists.
If wIndex is other than 0xFFFFFFFF, the service descriptor contains a specific service list.

Get Job Request

This request returns Service Descriptor.

| BmRequestType | bRequest | wValue | wIndex | wLength | Data |
| --- | --- | --- | --- | --- | --- |
| 10000000B | GET_DESCRIPTOR | TYPE_JOB_REQ | Zero | Length of Descriptor | Service Descriptor |

It is a Request Error if the USB Device doesn't support collaboration mechanism.
It is a Request Error if wValue or wIndex are other than as specified above.

Get Job Result

This request returns Service Descriptor.

| BmRequestType | bRequest | wValue | wIndex | wLength | Data |
| --- | --- | --- | --- | --- | --- |
| 10000000B | GET_DESCRIPTOR | TYPE_JOB_RES | Zero | Length of Descriptor | Service Descriptor |

It is a Request Error if the USB Device doesn't support collaboration mechanism.

It is a Request Error if wValue or wIndex are other than as specified above.

Advertise Service Descriptor

This request initiates Service Request.

| bmRequestType | bRequest | wValue | wIndex | wLength | Data |
|---|---|---|---|---|---|
| 00000000B | SET_DESCRIPTOR | TYPE_SERVICE SUBTYPE_TPL SUBTYPE_TCL SUBTYPE_THSL SUBTYPE_OTHER | var | Length of Descriptor | Service Descriptor |

It is a Request Error if the USB Device doesn't support collaboration mechanism.

It is a Request Error if wValue, wIndex or wLength are other than as specified above.

If wIndex is 0xFFFFFFFF, the service descriptor contains all service lists.

If wIndex is other than 0xFFFFFFFF, the service descriptor contains a specific service list.

Set Job Request

This request initiates Service Request.

| bmRequestType | bRequest | wValue | wIndex | wLength | Data |
|---|---|---|---|---|---|
| 00000000B | SET_DESCRIPTOR | TYPE_JOB_REQ | Zero | Length of Descriptor | Service Descriptor |

It is a Request Error if the USB Device doesn't support collaboration mechanism.

It is a Request Error if wValue, wIndex or wLength are other than as specified above.

Set Job Result

This request initiates Service Request.

| bmRequestType | bRequest | wValue | wIndex | wLength | Data |
|---|---|---|---|---|---|
| 00000000B | SET_DESCRIPTOR | TYPE_JOB_RES | Zero | Length of Descriptor | Service Descriptor |

It is a Request Error if the USB Device doesn't support collaboration mechanism.

It is a Request Error if wValue, wIndex or wLength are other than as specified above.

What is claimed is:

1. A method for processing one or more tasks with a default host dual-role device and a default peripheral dual-role device in a system including a plurality of dual-role devices, comprising:

receiving a collaboration request;

determining, by analyzing a type of at least one or more tasks and the capabilities of the default host dual-role device and the default peripheral dual-role device, whether the default host dual-role device or the default peripheral dual-role device will act as a host for processing said at least one of the tasks, wherein the type of said one or more tasks is indicated by a job request communicated between the default host dual-role device and the default peripheral dual-role device;

in response to the analysis, swapping host and peripheral roles, wherein the default peripheral dual-role device acts as the host and the default host dual-role device acts as a peripheral;

processing at least one of said one or more tasks with the default peripheral dual-role device acting as host; and changing the role of host from the default peripheral dual-role device to another one of the plurality of dual-role devices.

2. The method of claim 1, further comprising:

sending the job request from the default host dual-role device to the default peripheral dual-role device; and transferring control of at least one of the one or more tasks to the default peripheral dual-role device when the default peripheral dual-role device is acting as the host.

3. The method of claim 2, further comprising: returning a result to the default host dual-role device when the default peripheral dual-role device is acting as the host.

4. The method of claim 3, further comprising returning the role of peripheral dual-role device to the default peripheral dual-role device and returning the role of host to the default host dual-role device after the default peripheral dual-role device is acting as host and at least one of the one or more tasks have been processed.

5. The method of claim 1, wherein the receiving a collaboration request comprises receiving a collaboration request at the default host dual-role device.

6. The method of claim 1, wherein the receiving a collaboration request comprises receiving a collaboration request at the default peripheral dual-role device.

7. The method of claim 6, further comprising: transmitting the collaboration request to the default host dual-role device.

8. The method of claim 1, wherein the determining whether the default host dual-role device or the default peripheral dual-role device will act as a host for at least one of the one or more tasks comprises: analyzing one or more capabilities of the default host dual-role device; analyzing one or more capabilities of the peripheral dual-role device; and analyzing at least one of the one or more tasks in order to determine whether the default host dual-role device or the default peripheral dual-role device will act as a host for the at least one of the one or more tasks.

9. The method of claim 1, wherein the determining whether the default host dual-role device or the default peripheral dual-role device will act as a host for at least one of the one or more tasks comprises automatically determining whether the default host dual-role device or the default peripheral dual-role device will act as a host for at least one of the one or more tasks.

10. In a system including a plurality of dual-role devices a dual-role device comprising:
   a host service container comprising host services, wherein the host services include a list of supported application services,
   a peripheral service container comprised of peripheral services;
   means for receiving a collaboration request;
   means for determining, by analyzing a type of at least one or more tasks and the capabilities of the dual-role device and another dual-role device, whether the dual-role device or the other dual-role device will act as a host for processing said at least one of the tasks, wherein the type of one or more tasks is indicated by a job request communicated between the two dual-role devices;
   means, responsive to the analysis, for swapping operation of the two dual-role devices between host and peripheral roles;
   whereby in operation at least one of the one or more tasks is processed by the two dual-role devices, and thereafter the role of host is changed to another one of the plurality of dual-role devices.

11. The dual-role device of claim 10, further comprising a generic service container.

12. The dual-role device of claim 10, wherein the host services further comprise:
   a list of supported peripheral devices; and
   a list of supported class drivers.

13. In a system including a plurality of dual-role devices a dual-role device comprising:
   a host service container comprising host services, wherein the host services include a list of supported application services;
   a peripheral service container comprised of peripheral services;
   a reception and determination circuit for receiving a collaboration request and for determining, by analyzing a type of at least one or more tasks and the capabilities of the dual-role device and another dual-role device, whether the dual-role device or the other dual-role device will act as a host for processing said at least one of the tasks, wherein the type of one or more tasks is indicated by a job request communicated between the two dual-role devices;
   means, responsive to the analysis, for swapping operation of the two dual-role devices between host and peripheral roles, whereby in operation at least one of the one or more tasks is processed by the two dual-role devices, and thereafter the role of host is changed to another one of the plurality of dual-role devices.

14. The dual-role device of claim 13, further comprising a generic service container.

15. The dual-role device of claim 13, wherein the host services further comprise:
   a list of supported peripheral devices; and
   a list of supported class drivers.

* * * * *